Figure 1:
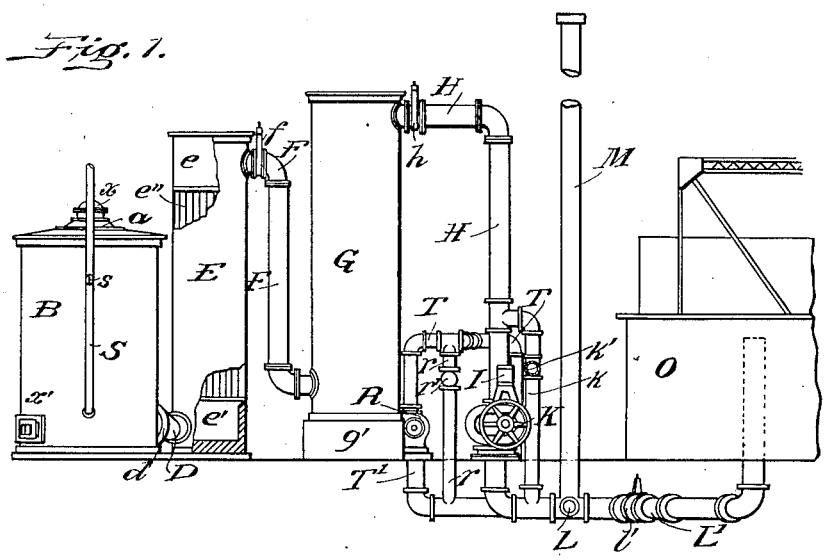

B. LOOMIS & H. PETTIBONE.
PROCESS OF MAKING AND DELIVERING MIXED GASES TO GAS ENGINES.
APPLICATION FILED MAY 22, 1907.

912,699.

Patented Feb. 16, 1909.

Witnesses
Francis S. Elden
C. H. Walker

Inventors
Burdett Loomis
Hawley Pettibone
By E. B. Clark
Attorney

B. LOOMIS & H. PETTIBONE.
PROCESS OF MAKING AND DELIVERING MIXED GASES TO GAS ENGINES.
APPLICATION FILED MAY 22, 1907.
912,699.
Patented Feb. 16, 1909.
2 SHEETS—SHEET 2.
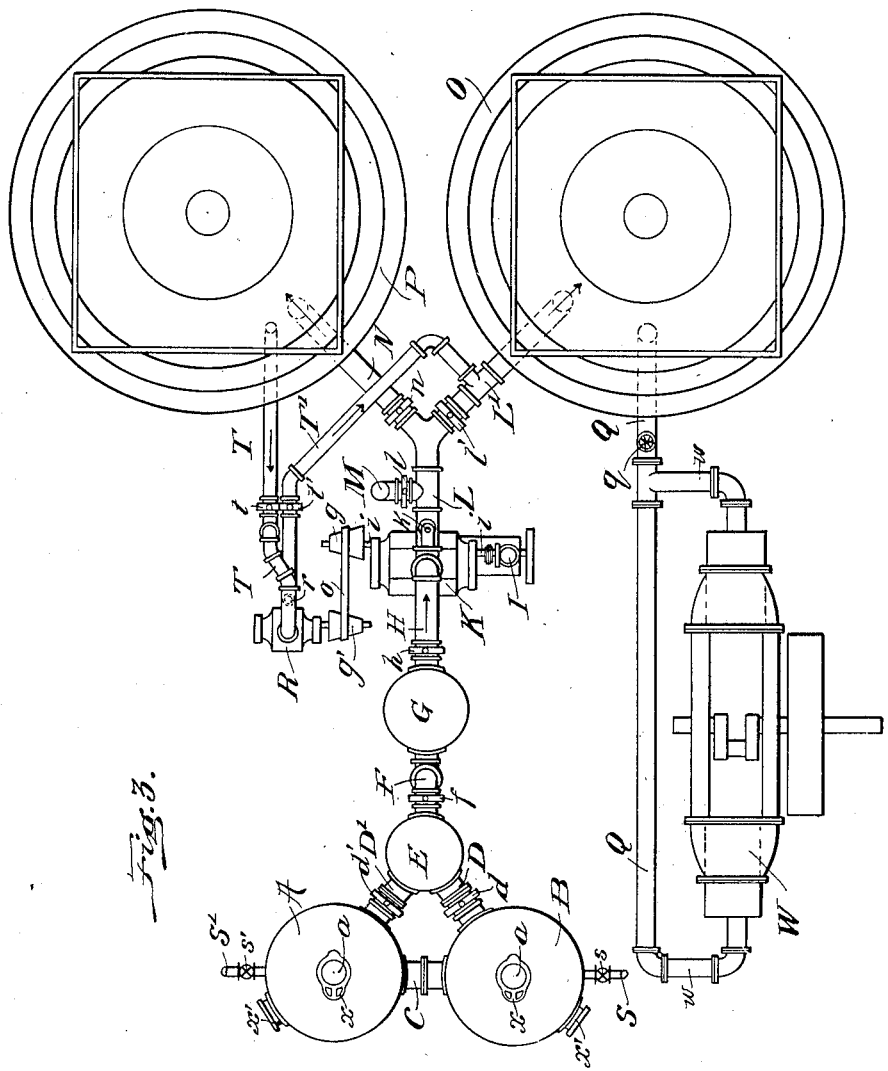

UNITED STATES PATENT OFFICE.

BURDETT LOOMIS, OF HARTFORD, CONNECTICUT, AND HAWLEY PETTIBONE, OF NEW ROCHELLE, NEW YORK, ASSIGNORS TO POWER AND MINING MACHINERY COMPANY, OF NEW YORK, N.Y., A CORPORATION OF NEW JERSEY.

PROCESS OF MAKING AND DELIVERING MIXED GASES TO GAS-ENGINES.

No. 912,699.      Specification of Letters Patent.      Patented Feb. 16, 1909.

Application filed May 22, 1907. Serial No. 375,036.

*To all whom it may concern:*

Be it known that we, BURDETT LOOMIS, residing at Hartford, in the county of Hartford and State of Connecticut, and HAWLEY PETTIBONE, residing at New Rochelle, in the county of Westchester and State of New York, citizens of the United States, have invented certain new and useful Improvements in Processes of Making and Delivering Mixed Gases to Gas-Engines, of which the following is a specification.

This invention relates to improved method for making, delivering and mixing gases of any desired calorific value and in any desired proportions of their constituents relative to their heat units so as to have them adapted for motive power in high power gas engines, or adapted to be exploded, burned or inflamed in a manner analogous to their action in such engines as concerns their calorific value and efficiency.

The object of the invention is to provide for generating a gas of the nature of that generally termed producer gas, and also a gas of the nature of that termed water gas, drawing them from the generating or producer furnaces by suitable means and, by suitable means, producing a mixture thereof in predetermined, though variable proportions, to have them give the most effective and economical results as a motive agent in an explosive engine of high horse-power.

Heretofore, gas engines have been operated by illuminating gas, and attempts have been made to operate engines of 100 H. P. and more with water gas, but the flame temperature and heat units of such gas have been found to be too high to give satisfactory results. The explosions produced by water gas, owing probably to the large percentage of hydrogen therein, are too sharp and quick; the inertia of the heavy engine parts is too great to be efficiently overcome; the gas is apt to fire back and the engines are so strained and racked that an uneven power is generated. Water gas ignites at so low a temperature that when properly mixed with air for the explosive charge in a gas engine, the charge will explode prematurely during the operation, due to the heat caused by compression and the hot internal parts. Since the efficiency of a gas engine increases with the compression of the charge it is important to have a gas that will stand high compression. On the other hand a gas having the characteristics of producer gas has also been found to be not available because of a large percentage of carbonaceous constituents—unfixed carbon and nitrogen—these not only causing sluggishness in the explosions but also tending to leave so large a quantity of residual matter in the form of sooty or charry bodies as to seriously interfere with, and finally render inoperative, the various ports or passageways and the valves and small moving parts of the engine. By varying the calorific value and constituents of the gas produced and delivered by the one apparatus, a mixture can be made of such quality as is best adapted for use in the particular engine it must operate.

We have found that a mixture of water-gas and producer-gas in suitable proportions (varied to meet the variations in the constitution of the gases due to variations in the constituents of the initial fuel material and to variations in conditions of production) gives a substantially uniform body which can be used with great efficiency in high power explosive engines.

Figure 2:
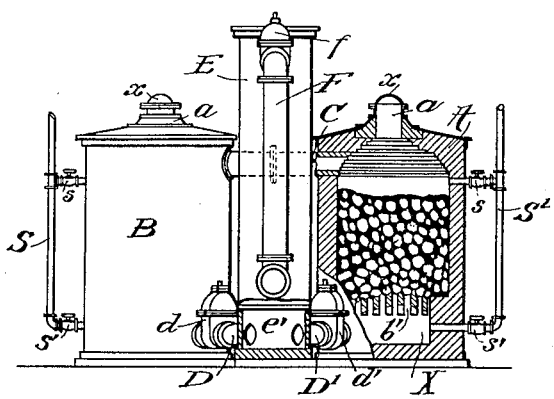

Figure 1 shows in side elevation one form of apparatus by which our improved method can be carried out, of operating a gas engine and supplying it with a proportioned mixture of producer-gas and water-gas. Fig. 2 is a rear elevation of the connected generators and a steam boiler, parts being shown in sections. Fig. 3 is a top plan view of Fig. 1, showing an apparatus containing our improvements.

The generators A and B are constructed of brick inclosed in iron jackets in the usual manner and are provided with grates $b'$, of any desired construction, and with ash pits X. The generators are connected at the top by a pipe or flue C, and are connected at the base or ash pits X by gas outlet pipes D, $D^1$—having valves $d$, $d'$—with the base of the tubular steam boiler E, having at top and bottom, the gas chambers $e$, $e'$ and tubes $e''$ connecting the upper and lower tube sheets. A gas outlet pipe F, having a valve $f$, connects with the upper gas chamber $e$ and with the base of the scrubber G, and a gas outlet pipe H, having a valve $h$, leads from the top of the scrubber down to the main gas exhauster K. The main gas take-off pipe L leads from the under side of the exhauster and connects by the branch pipe L¹, having a valve l', with the holder O for producer-gas or a mixture of producer gas and water gas. A branch pipe having a valve l connects pipe L with the purge stack M for the escape of waste gases, or products of combustion. A branch pipe N, having a valve n, leads from the pipe L into holder P for water-gas. The pipe T, having a valve t, leads from the holder P and connects with the top of the small exhauster R. The discharge pipe T¹ from exhauster R is provided with a valve t' and connects with pipe L¹ beyond its valve l' for supplying a definite proportion of water-gas and mixing it with the producer-gas which is being passed through pipe L¹ into the holder O. A by-pass and circulating pipe r, having a valve r', connects the outlet pipe T¹ with the inlet pipe T of the exhauster R. A by-pass and circulating pipe k connects the outlet pipe L with the inlet-pipe H of the exhauster K, and is provided with the valve k'. The exhauster K is driven by the engine I having a shaft i which is coupled directly to the shaft of the exhauster. The opposite end of the shaft i is provided with a cone pulley g, which connects by a belt o with a cone pulley g' on the shaft of the auxiliary exhauster R. When both holders are full, or holder O, only, is full of gas, or if for other reason it is desired to stop, or reduce the generation of gas, the valve k' in by-pass pipe k may be opened, while, the exhauster is kept running, and gas will be circulated through the exhauster, its inlet and outlet pipes and by-pass pipe k. This is more satisfactory than stopping the exhauster and then starting it again when it is desired to resume the production and withdrawal of gas. In a similar manner the by-pass pipe r and valve r' may be used for circulating water-gas instead of stopping the exhauster R. Steam supply pipes S and S¹ connect by branch pipes s and s', each having a valve, with the top and bottom of each of the generators A and B for supplying steam to be passed either up or down through the bodies of incandescent fuel in making water-gas. A gas outlet-pipe Q, having a valve q leads from holder O for taking mixed producer-gas and water-gas to a gas-engine W, and a branch-pipe Q' may take gas to any other place of use.

W indicates a gas engine connecting by pipes w and Q with holder O. This engine may be of any of the usual styles or of any preferred sort so far as concerns the principle of construction of its several parts. The present invention is more particularly applicable to gas engines of the larger and more powerful sorts. In these are used large pistons having long strokes and of correspondingly large parts connected therewith, or directly related thereto. At each stroke the piston exerts a powerful suction action, by means of which gas is drawn through pipe w which communicates with holder O.

With the apparatus shown in Fig. 3, the operation of making and mixing producer-gas and water-gas and supplying the engine may be conducted as follows:—Fires are kindled on the grates in generators A and B, and at first allowed to burn by natural draft while fuel is gradually fed in and ignited. The valves l' and n being closed, and the stack valve l and other valves between the stack and generators being open, and the lids x wholly, or partly, open, the exhauster K is operated to draw air down into the bodies of ignited fuel, and draw the resulting gas off from the bases of the generators, through boiler E and scrubber G, and discharge it up the stack M. As soon as good producer-gas is generated the stack valve l is closed, valve l' opened, and the producer gas is discharged into the holder O. The stack valve l is only open while the bodies of fuel are being heated to the proper condition for making gas.

Deep bodies of fuel in generators A and B having been heated to incandescence, water-gas may be made, and for this purpose the top lids x are closed, valve d' closed, valve l' closed, valve n opened and steam valve s' opened, admitting steam into the ash pit of generator A. Steam passes up into the body of incandescent fuel in generator A where it is decomposed and the resulting water-gas passes through top pipe C into generator B and thence down through the body of incandescent fuel therein where any accompanying vapors are decomposed, and carbonic acid converted into carbon monoxid, making a well-fixed high grade water-gas. This gas is drawn off by the exhauster through pipe D, boiler E, and scrubber G and discharged into the water-gas holder P. Water-gas is thus made till the temperature of the fuel is reduced too low for effectively decomposing steam and then the steam is shut off, the top lids x opened, valve d' opened, valve n closed and valve l' opened and producer-gas again made and delivered into the holder O. When it is again desired to make water-gas we preferably close valve d in gas outlet pipe D, and admit steam into the base of generator B. Steam is then decomposed by passage up through the incandescent fuel in generator B, and the resulting gas down through the bed of fuel in generator A, and the resulting water-gas is drawn off by the exhauster through pipe D¹, the steam boiler and scrubber, and discharged into holder P.

A sufficient quantity of water-gas having been stored in the holder P, the auxiliary exhauster R is used to deliver a fixed proportion of water-gas with producer-gas into the holder O for mixed gas. The exhauster R and the valves $r'$ and $t'$ are operated as follows:

When the exhauster K is operating and delivering producer-gas through valve $l'$, the valves $t$ and $t'$ are opened and the by-pass valve $r'$ is closed, and the exhauster R will operate to draw water-gas from the holder P and deliver it through pipe $T^1$ into the holder O at a rate proportional to the delivery of producer-gas by the exhauster K.

By shifting the belt $o$ on the cone pulleys $g$ and $g'$, the proportion of water-gas to producer-gas can be increased or decreased. The mixture of water-gas and producer-gas in definite and any desired proportions can thus be stored in the holder O and delivered to gas engines or other places of use.

When water-gas is being delivered through valve $n$ to the holder P, valve $t'$ may be closed and the by-pass valve $r'$ may be opened, so that no water-gas passes into the mixed gas holder O, except when producer-gas is also being delivered into said holder O.

After a measured volume of producer-gas has been stored in holder O, the supply of producer-gas thereto may be stopped, and then a measured volume of water-gas is passed into holder O, being drawn from holder P, or directly from the generator. The gases will mix by diffusion in holder O and may be delivered, in a suitably mixed condition, therefrom to gas-engine W. The holder O, being supplied with producer-gas and the holder P with water-gas, the two gases may be drawn out, in definite proportions, best suited to form explosive charges in the particular sort of gas engine in use, and delivered through a connecting pipe P' to the engine.

It will be understood that the dimensions of the parts which generate the gas, as well as those by which the gas is carried from point to point and those of the storing vessels or holders, and also the speeds of the several operative parts, will be particularly related to the capacity and demand of the gas engine W so that there will be as near as practicable a constant quantity of accurately proportioned and commingled gases in the holder O, ready to sustain the operation of the engine.

If it is not desired to measure the quantity of water gas beyond the measuring which is attained through controlling the steam which is introduced into the producer (and under many circumstances the proportional quantities of the two gases can be attained in that way) the water gas can be taken directly from the pipe H to the pipe L and thence through the pipe L' directly to the holder O; in such case the valve at $n$ being closed and the supplementary exhauster at R being thrown out of action. Under these circumstances a volume of producer gas is first introduced directly to the holder O and thereafter an approximately pre-determined volume of water gas is taken directly to the same holder.

Gas engines of the heavy power class require, first, explosions of a peculiar character, second, cleanliness after explosion, and, third, that the explosion should be relatively prolonged in time. If a gas similar to producer-gas and having only the qualities and characteristics of that gas be delivered, alone, to the gas engine it may furnish material for explosions, but these are accompanied by, or result in, several disadvantageous matters, as for instance, a slowness and sluggishness in the firing of the gas, or explosion, with liability of incompleteness of combustion, secondly, the depositing of carbonaceous matters of a sooty or tarry character. On the other hand, if a gas having the qualities and characteristics of water-gas be delivered alone, to a gas engine explosions will occur which, though they may not result in the disadvantage incident to the producer-gas, and will leave the valves and other parts of the engine in a cleanly condition, are, nevertheless, not efficient with engines of the larger sort, as the impulses are too quick, short, sharp and violent, and will not work advantageously in a long or laterally expanded explosion chamber or piston driving chamber.

Instead of operating a gas engine with gaseous bodies of the above sorts we provide an explosive agent containing intelligently and accurately predetermined proportions of these two widely differing gaseous bodies with the result that the producer gas is, by the water gas, caused to more thoroughly and uniformly and somewhat more rapidly explode than would be the case if it were used alone, and the producer gas by more complete combustion and explosion leaves the engine parts in a cleanly condition; while, on the other hand, the water gas is, by the intermingled producer gas, checked with respect to the quickness, sharpness and violence of its explosions. By first completely separating the two kinds of gas and then accurately commingling them in proportions subject to variation corresponding to the variations in their constitution which result from different fuel materials or from different conditions in production, the gas engineer is provided with a means for obtaining explosions with complete combustion and of such character that he can impart to his large and relatively slowly moving piston exceedingly efficient energy impulses.

While we have herein specifically referred to, and described, the action of these gaseous products when utilized to operate gas engines, (in order that the essential matters incident to the invention may be clearly exemplified), we are not aware that prior to our invention these two gases in fixed conditions have been successively made by means of one and the same producer and collected therefrom in separate volumes and cleansed when necessary, and subsequently mixed or commingled as desired and then exploded, burned, or inflamed, whether in an engine, or otherwise, in such way as to mutually and reciprocally affect the actions, each of the other, in the manner described herein at the time of their inflaming or burning.

We do not herein claim specifically the combination of a generator, an exhauster, a holder for producer gas, a separate holder for water gas, and means for supplying gas from one of these holders to the other, preparatory to supplying the mixture to the gas engine, as we have made that one of the subjects matter of claims in our Patent 833,137, issued October 9, 1906. Nor do we herein claim the process of generating the producer gas and the water gas in separate volumes, and, after generating them, storing them in separate holders, and then mingling them in predetermined quantities and delivering the mixture to a gas engine, as we have made that one of the subjects matter of claims presented in our application 334,792, filed September 15, 1906, on which was issued Letters Patent No. 863,730, dated August 20, 1907, of which application the present one is filed as a division. Nor do we herein claim an apparatus consisting of the generator for producing water gas and producer gas in separate volumes and in combination therewith a holder for the producer gas, a second holder for the water gas and a supplemental or third holder interposed between the aforesaid holders and the engine, as we have made that one of the subjects matter of claims presented in an application of even date herewith.

The claims herein presented relate to the initial generating of the gases alternately or successively in separate volumes and then bringing them together in a condition of thorough commingling in order to attain the marked advantages above set forth incident to their reciprocal action when delivered to and exploded in a gas engine, or inflamed in a way analogous thereto as concerns their calorific value and efficiency.

What we claim is—

1. The method of operating a gas engine and supplying an explosive gaseous mixture thereto consisting in first passing air through a chamber containing a body of ignited fuel and drawing from said chamber a volume of producer gas, cleansing said gas, temporarily storing or arresting said gas in its passage to the gas engine, then forming a volume of water gas by passing steam through the said body of heated fuel, then mingling the said volume of water gas with the aforesaid volume of producer gas, the said operations being carried on substantially as set forth to have in the mixture approximately predetermined portions of the respective gases, causing the mixture of the said gases to advance toward, and delivering it to a gas engine and exploding it therein, substantially as set forth.

2. The method of operating a gas engine and supplying thereto a mixture of water gas and producer gas approximately in explosive proportions, consisting in first passing air through a chamber containing a body of ignited fuel, and drawing from said chamber a volume of producer gas, cleansing said gas, temporarily storing or arresting said gas in its passage toward the gas engine, then forming a volume of water-gas by passing steam through said body of heated fuel, then mingling the said volume of water-gas with the aforesaid volume of producer-gas, causing a mixture of the said gases to advance toward, and delivering it to, a gas-engine and exploding it therein, substantially as set forth.

3. The herein described method of manufacturing and supplying a mixture of water-gas and producer-gas, consisting in first passing air through a chamber containing a body of ignited fuel and drawing from said chamber a volume of producer gas, cleansing said gas, temporarily storing said gas or arresting it in its passage to the point of combustion, then forming a volume of water gas in said producer chamber by passing steam through the said body of heated fuel, then mingling the said volume of water-gas with the aforesaid volume of producer-gas, the said operations being carried on substantially as set forth, causing the gaseous mixture to advance toward and delivering it to, a region of combustion and burning it therein, substantially as set forth.

In testimony whereof we affix our signatures in presence of two witnesses.

BURDETT LOOMIS.
HAWLEY PETTIBONE.

Witnesses:
C. LEE STRAUB,
EDGAR M. LEVENTRITT.